US008320950B2

(12) United States Patent
Yang et al.

(10) Patent No.: US 8,320,950 B2
(45) Date of Patent: Nov. 27, 2012

(54) METHOD FOR INCREASING SYNCHRONOUS CONTROL CHANNEL CAPACITY IN A WIRELESS SYSTEM

(75) Inventors: Yang Yang, Parsippany, NJ (US); Sigen Ye, Randolph, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 739 days.

(21) Appl. No.: 11/423,354

(22) Filed: Jun. 9, 2006

(65) Prior Publication Data

US 2007/0286148 A1 Dec. 13, 2007

(51) Int. Cl.
*H04B 7/00* (2006.01)
(52) U.S. Cl. ........ 455/515; 370/345; 370/347; 370/350; 455/450; 455/451
(58) Field of Classification Search .................. 370/345, 370/347, 350; 455/450, 515
See application file for complete search history.

(56) References Cited

U.S. PATENT DOCUMENTS

| 5,778,318 | A | * | 7/1998 | Talarmo et al. | ............ | 455/452.1 |
| 5,933,418 | A | * | 8/1999 | Massingill et al. | ........... | 370/321 |
| 6,470,004 | B1 | | 10/2002 | Murata | .......................... | 370/347 |
| 6,888,805 | B2 | * | 5/2005 | Bender et al. | ................ | 370/314 |
| 2005/0030918 | A1 | | 2/2005 | Motegi et al. | ................ | 370/328 |
| 2006/0285601 | A1 | * | 12/2006 | Julian et al. | ................... | 375/260 |
| 2007/0274288 | A1 | * | 11/2007 | Smith et al. | .................... | 370/351 |
| 2008/0013485 | A1 | * | 1/2008 | Gorokhov et al. | ............ | 370/329 |

FOREIGN PATENT DOCUMENTS

| EP | 1 494 495 | 1/2005 |
| WO | WO95/19687 | 7/1995 |
| WO | WO02/078371 A2 | 10/2002 |

OTHER PUBLICATIONS

International PCT Search Report PCT/US2007/013467 and Written Opinion mailed Nov. 7, 2007.
Rodriguez-Herrera, A., "Applying the Convex Metric and the Spatial Channel Model for HRPD Rev-A" Wireless Communications and Networking Conference, 2006 IEEE Las Vegas, NV, USA Apr. 3-6, 2006 pp. 1800-1805 XP010941214 ISBN:1-4244-0269-7, p. 1801, paragraph III.
Japanese Communication Examiner's Office Letter dated May 15, 2012.

* cited by examiner

*Primary Examiner* — Vladimir Magloire
(74) *Attorney, Agent, or Firm* — Williams, Morgan & Amerson, P.C.

(57) ABSTRACT

A method is provided for controlling delivery of packets over a synchronous control channel in a wireless system employing the High Rate Packet Data (HRPD) standard. The synchronous channel is comprised of a plurality of slots, and a first packet is sent over the synchronous control channel in a first one of the plurality of slots along with an indication of a second one of the plurality of slots in which a second packet will be delivered. Thereafter, the second packet is sent over the control channel in the second one of the plurality of slots. Subsequent packets are handled similarly.

23 Claims, 4 Drawing Sheets

METHOD FOR INCREASING SYNCHRONOUS CONTROL CHANNEL CAPACITY IN A WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations (e.g., Node Bs) distributed within an area to be serviced by the system. Various Access Terminals (ATs, also known as User Equipment (UE), mobile devices, and the like) within the area may then access the system and, thus, other interconnected telecommunications systems, via one or more of the base stations. Typically, an AT maintains communications with the system as it passes through an area by communicating with one and then another base station, as the AT moves. The AT may communicate with the closest base station, the base station with the strongest signal, the base station with a capacity sufficient to accept communications, etc.

Communications between the ATs and the base stations may occur over a variety of channels, including dedicated and shared channels. Typically, when an AT is not currently involved in a communication session, it enters an idle mode of operation where the dedicated channels are dropped and it monitors only a shared channel to periodically determine if the base station is attempting to contact it. For example, in a wireless data technology known as High Rate Packet Data (HRPD), a control channel protocol provides a mechanism for an access network to deliver broadcast, multicast and unicast messages to idle and active ATs. The synchronous control channel is typically used to carry overhead messages, multicast and unicast messages (e.g., paging signals) to idle ATs. Currently, the forward link employs a 4-slot interlace structure, and the synchronous control channel can only use one of the 4 interlaces. Therefore, the maximum capacity of the synchronous control channel is 25% of the total forward link slots.

However, synchronous control channel usage has increased dramatically such that the 25% usage rate has become problematic. For example, with more applications (such as VoIP, PTT, Video Telephony) being employed in HRPD systems, control channel usage has increased significantly. Delivery of Page messages introduces very heavy traffic on the synchronous control channel. Additionally, for many attractive applications (such as, emergent notifications, community services, targeted advertisements, etc.), it is very fast, flexible and efficient to deliver short multicast messages to a group of people over the synchronous control channel. Further, Data over Signaling protocol, introduced in HRPD Rev. A, allows short data burst to be encapsulated in signaling messages and delivered over the synchronous control channel. Therefore, it becomes highly probable that the 25% usage rate of the forward link slots will be insufficient to accommodate all the traffic on the synchronous control channel.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for controlling delivery of packets over a control channel comprised of a plurality of slots. The method comprises sending a first packet over the control channel in a first one of the plurality of slots along with an indication of a second one of the plurality of slots in which a second packet will be delivered. Thereafter, the second packet is sent over the control channel in the second one of the plurality of slots.

In another aspect of the instant invention, a method is provided for controllably receiving packets over a control channel comprised of a plurality of slots. The method comprises receiving a first packet over the control channel in a first one of the plurality of slots along with an indication of a second one of the plurality of slots in which a second packet will be received. Thereafter, the second one of the plurality of slots is monitored to receive the second packet.

BRIEF DESCRIPTION OF THE DRAWINGS

The invention may be understood by reference to the following description taken in conjunction with the accompanying drawings, in which like reference numerals identify like elements, and in which.

Figure 1:
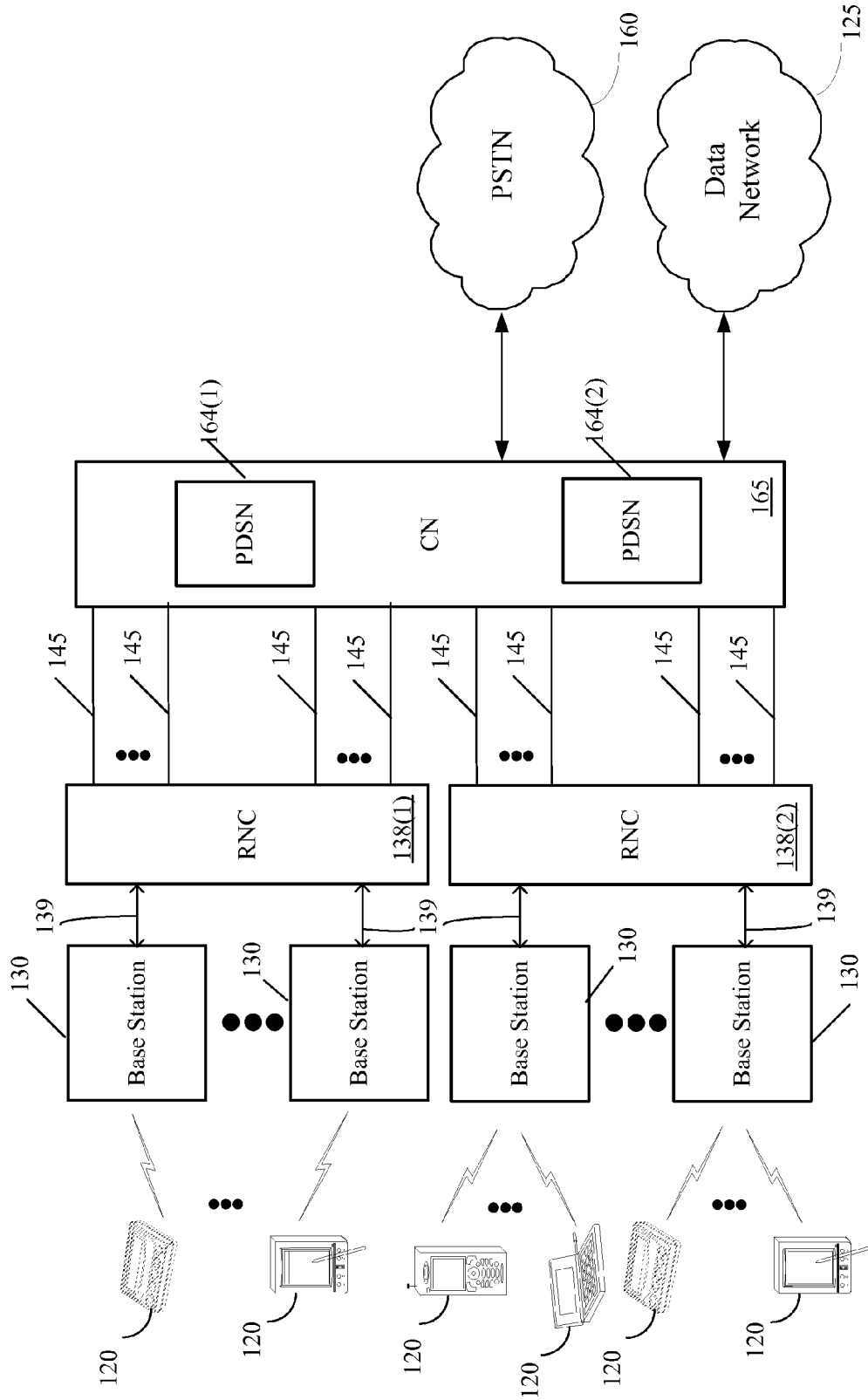
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation may be described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Turning now to the drawings, and specifically referring to FIG. 1, a communications system 100 is illustrated, in accordance with one embodiment of the present invention. For illustrative purposes, the communications system 100 of FIG. 1 is an architecture based on the High Rate Packet Data (HRPD) standard, although it should be understood that the present invention may find application in other systems that support data and/or voice communication. The communications system 100 allows one or more ATs 120 to communicate with a data network 125, such as the Internet, through one or more base stations 130. The AT 120 may take the form of any of a variety of devices, including cellular phones, personal digital assistants (PDAs), laptop computers, digital pagers, wireless cards, and any other device capable of accessing the data network 125 through the base station 130.

In one embodiment, a plurality of the base stations 130 may be coupled to a Radio Network Controller (RNC) 138(1-2) by one or more connections 139. Although two RNCs 138(1-2) are illustrated, those skilled in the art will appreciate that more RNCs 138 may be utilized to interface with a large number of base stations 130. Generally, the RNC 138 provides signaling and traffic processing for each wireless data session. The AT 120, base station 130, RNC 138 and the interfaces between these components comprises a radio access network (RAN).

The RNC 138 is coupled to a Core Network (CN) 165 via a connection 145. Generally, the CN 165 operates as an interface to a data network 125 and/or to a public telephone system (PSTN) 160. The CN 165 performs a variety of functions and operations, such as user authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the ATs 120 and the data network 125. It should be understood, however, that the configuration of the communications system 100 of FIG. 1 is exemplary in nature, and that fewer or additional components may be employed in other embodiments of the communications system 100 without departing from the spirit and scope of the instant invention.

Figure 2:
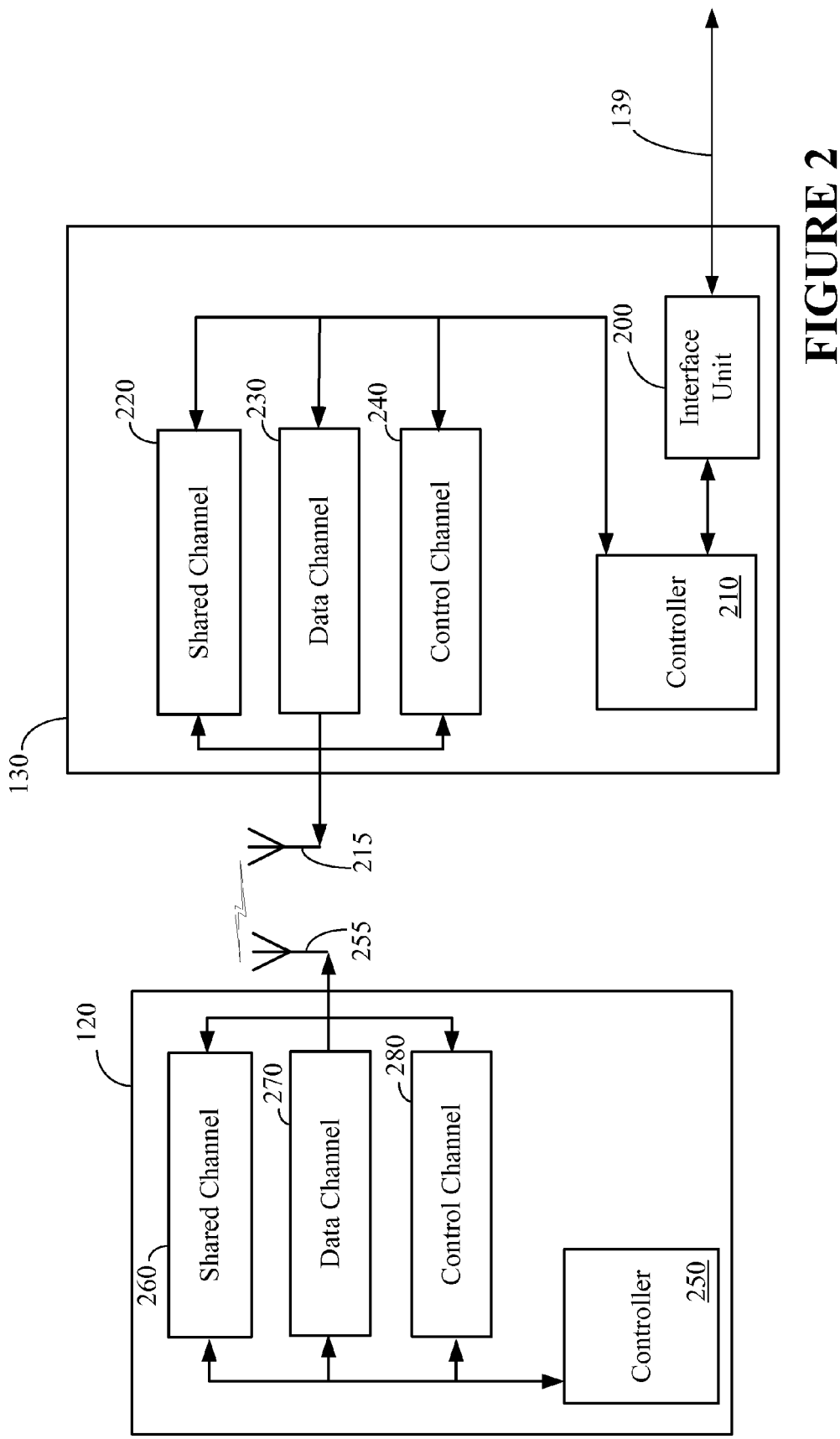
FIG. 2 depicts a block diagram of one embodiment of a base station, an access terminal and a radio network controller used in the communications system of FIG. 1.

Referring now to FIG. 2, a block diagram of one embodiment of a functional structure associated with an exemplary base station 130 and AT 120 is shown. The base station 130 includes an interface unit 200, a controller 210, an antenna 215 and a plurality of channels: a shared channel 220, a data channel 230, and a control channel 240. The interface unit 200, in the illustrated embodiment, controls the flow of information between the base station 130 and the RNC 138 (see FIG. 1). The controller 210 generally operates to control both the transmission and reception of data and control signals over the antenna 215 and the plurality of channels 220, 230, 240 and to communicate at least portions of the received information to the RNC 138 via the interface unit 200. For example, one piece of information transmitted from the base station 130 to the RNC 138 is information used by the base station 130 to communicate with the ATs 120.

The AT 120 shares certain functional attributes with the base station 130. For example, the AT 120 includes a controller 250, an antenna 255 and a plurality of channels: a shared channel 260, a data channel 270, and a control channel 280. The controller 250 generally operates to control both the transmission and reception of data and control signals over the antenna 255 and the plurality of channels 260, 270, 280.

Normally, the channels 260, 270, 280 in the AT 120 communicate with the corresponding channels 220, 230, 240 in the base station 130. Under the operation of the controllers 210, 250, the channels 220, 260; 230, 270; 240, 280 are used to effect a controlled scheduling for communications from the AT 120 to the base station 130.

Figure 3:
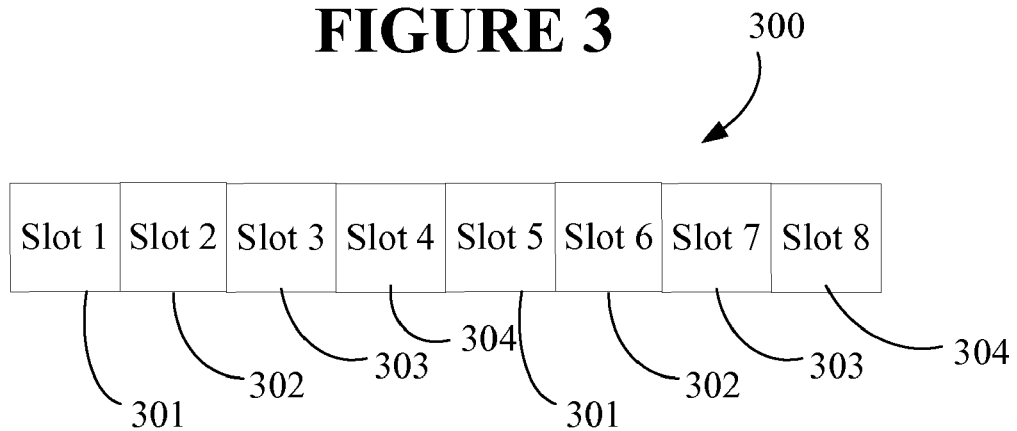
FIG. 3 depicts a stylistic representation of forward link interlaces of the HRPD system.

Referring now to FIG. 3, a stylistic representation of a forward link synchronous control channel 300 having a 4-slot interlace structure is depicted. In a wireless system employing the HRPD standard, the synchronous control channel 300 is divided into a 4-slot interlace. That is, beginning with slot 1, every fourth slot (e.g., slot 5, slot 9, etc.) is assigned to a first interlace 301. Similarly, slot 2 and every fourth slot thereafter (e.g., slot 6, slot 10, etc.) is assigned to a second interlace 302. Slot 3 and every fourth slot thereafter (e.g., slot 7, slot 11, etc.) is assigned to a third interlace 303. Likewise, slot 4 and every fourth slot thereafter (e.g., slot 8, slot 12, etc.) is assigned to a fourth interlace 304.

In one embodiment of the instant invention, the synchronous control channel 300 is capable of employing all four interlaces 301-304, rather than just one interlace, so that its capacity is significantly improved. The first packet of the synchronous control channel 300 is sent in the interlace 301-304 specified in the current standard, such as the first interlace 301 in slot 1. All subsequent packets, sent after the transmission of the first packet is completed, may be sent in any one of the four interlaces 301-304.

In one embodiment of the instant invention, broadcast, multicast and unicast messages may be handled separately. Broadcast messages may be transmitted the same way as in the current HRPD standard. That is, broadcast messages may be transmitted in only one of the interlaces 301-304, the specified interlace, such as the first interlace 301 at slots 1, 5, 9, etc. The ATs 120 need only monitor the specified interlace 301-304 until the synchronous control channel capsule in that interlace finishes.

Figure 4:
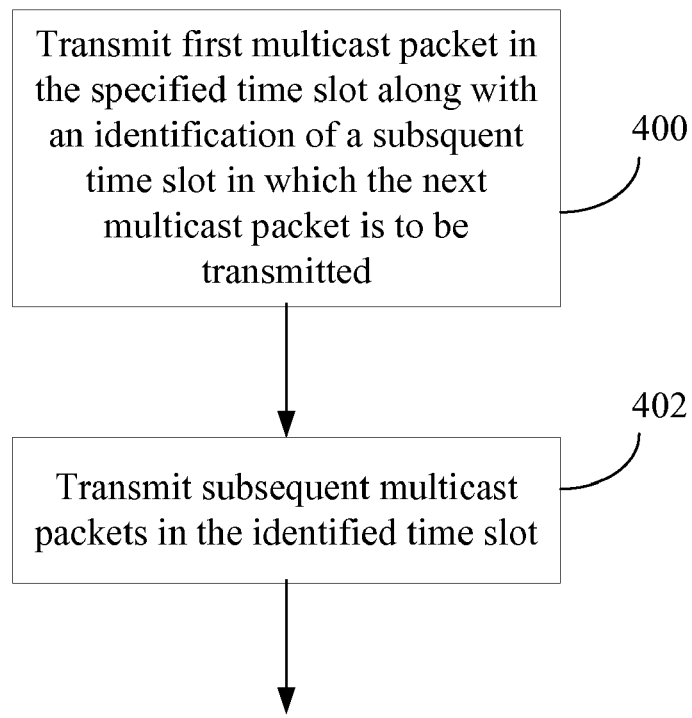
FIG. 4 is one embodiment of a flow chart representation of a method that may be used by the base stations of FIGS. 1 and 2 to provide greater utilization of the forward link slots of the synchronous control channel.
Figure 5:
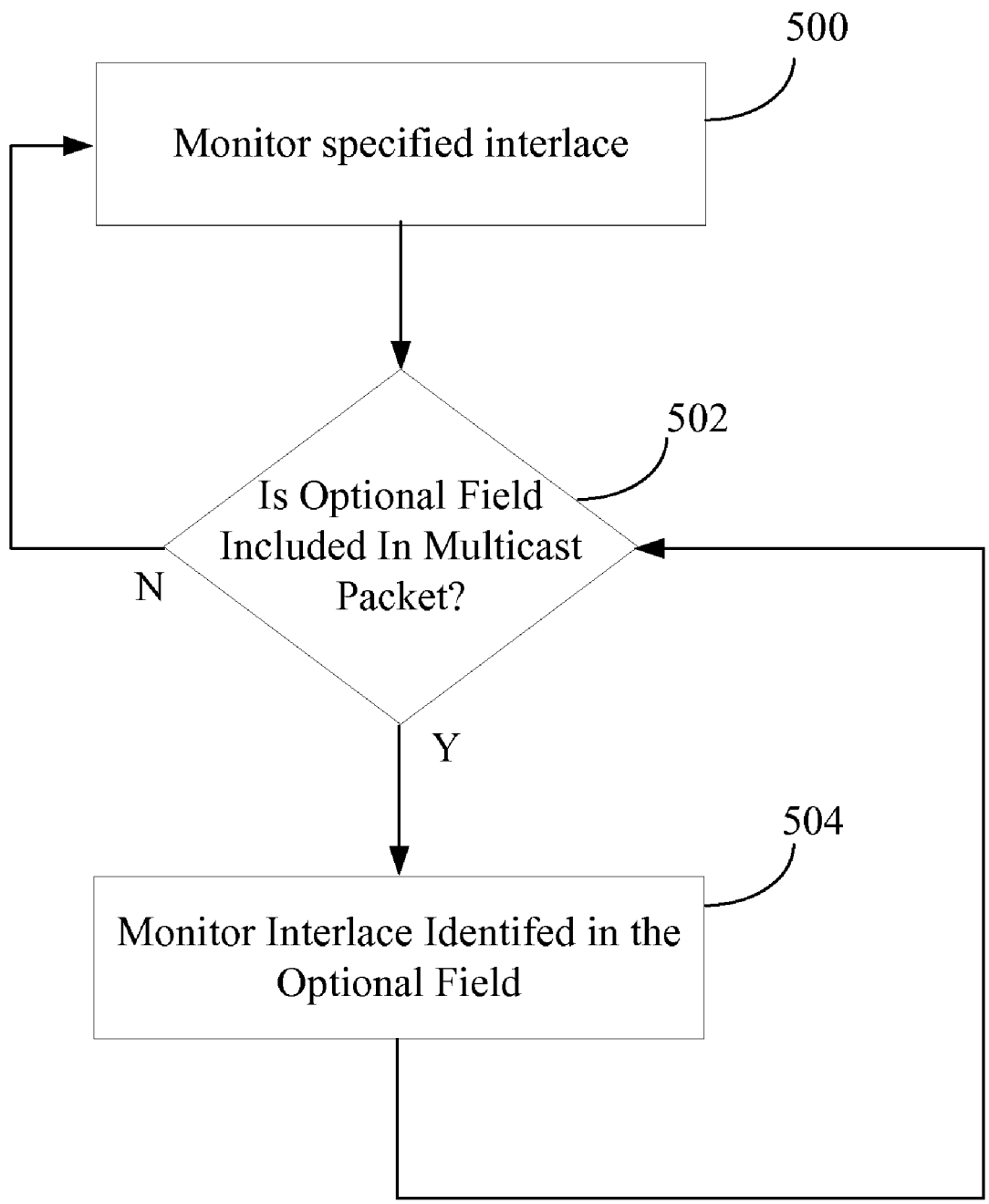
FIG. 5 is one embodiment of a flow chart representation of a method that may be used by the access terminals of FIGS. 1 and 2 to provide greater utilization of the forward link slots of the synchronous control channel.

As shown in the flowchart representations of FIGS. 4 and 5, multicast packets are handled differently. Turning first to FIG. 4, the operation of the base station 130 during a multicast transmission is shown. As shown in block 400, the base station 130 transmits the first multicast packet for a multicast group in the same way as the current standard, so that the ATs 120 receive it by monitoring the specified interlace 301-304, such as the first interlace 301 at slots 1, 5, 9, etc. Thereafter, multicast packets may be sent in any subsequent interlace 301-304. An optional field is added in the MAC overhead of the multicast packet to indicate the interlace and/or time slot location of the next packet that the ATs 120 in the multicast group should monitor. If the field is omitted, the current standard rules. In this way, part of the multicast messages can be sent outside the regular synchronous control channel interlaces and/or time slots. For example, the first packet in the first interlace 301 at time slot 1 may include the optional field to indicate that the next packet will be sent in the second interlace 302 at the time slots 2, 6, 10 etc. Thereafter, the packet contained in the second interlace 302 at time slot 2 may include the optional field to indicate that the next packet will be sent in the third interlace 303 at time slot 3. Likewise, the third interlace 303 may include the optional field to indicate that the next packet will be sent in the fourth interlace 304 at time slot 4. In this manner, the base station 130 may use all, or a desired portion, of the interlaces 301-301 to transmit the multicast packets, as shown in block 402.

Turning to FIG. 5, the operation of the AT 120 during a multicast transmission is shown. At block 500, the AT 120 monitors the specified interlace 301-304 for the first packet of the multicast message, such as the first interlace 301 at time sots 1, 5, etc. At block 502, the AT 120 inspects the multicast message to determine which interlace 301-304 to monitor for the next multicast packet. If the optional field is not included in the multicast packet, then control transfers to block 500 where the AT 120 again monitors the next default or specified interlace 301-304. Alternatively, if the optional field is included in the multicast packet, then at block 504, the AT 120 monitors the identified interlace 301-304, such as the second interlace 302 at time slots 2,6, etc.

Increasing the capacity of the synchronous control channel 300 to handle unicast messages can be achieved in two ways. The approach described above for multicast packets may be applied to unicast packets as well. Alternatively, the base station 130 may send a broadcast message, or add a new field in an existing broadcast message, to indicate which of the interlaces 301-304 available for unicast messages over the synchronous control channel 300. A hashing function is specified to let each AT 120 determine which interlace(s) 301-304 it needs to monitor for unicast messages over the synchronous control channel 300. A matching hashing function is implemented in the base station to determine the interlaces 301-304 in which to send the unicast packets.

In one embodiment of the instant invention, all the other functions in the current HRPD standard may remain the same. Additionally, existing overhead messages, such as Qpage, can be used to notify the idle mobile terminals of upcoming messages on the synchronous control channel 300 so as to reduce power consumption by the AT 120 due to wake-ups.

Those skilled in the art will appreciate that in addition to increasing the synchronous control channel capacity, the instant invention also improves message delivery latency because multiple packets can be sent in parallel in different interlaces.

Those skilled in the art will appreciate that the various system layers, routines, or modules illustrated in the various embodiments herein may be executable control units. The controllers may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controlling delivery of packets over a forward link control channel that is divided into a plurality of interlaces, wherein each interlace comprises every N-th slot of the forward link control channel, and wherein N>1, the method comprising:

signaling a change in the interlaces used to carry packets over the forward link control channel from a first interlace to a second interlace, wherein the change is signaled by sending, from a base station, a first packet over the forward link control channel in the first interlace, the first packet including information indicating that a second packet will be delivered over the forward link control channel in the second interlace, which is different than the first interlace; and sending the second packet over the forward link control channel in the second interlace.

2. A method, as set forth in claim 1, wherein sending the first packet over the forward link control channel comprises multicasting the first packet over a synchronous forward link control channel in the first interlace, and wherein the first packet includes information indicating that the second packet will be multicast in the second interlace.

3. A method, as set forth in claim 1, wherein sending the first packet over the forward link control channel comprises sending the first packet over a synchronous forward link control channel in a system employing the High Rate Packet Data standard.

4. A method for controllably receiving packets over a forward link control channel that is divided into a plurality of interlaces, wherein each interlace comprises every N-th slot of the forward link control channel, and wherein N>1, the method comprising:

receiving, at a mobile unit, a first packet over the forward link control channel in a first interlace, the first packet including information indicating a change in the interlace used to carry packets over the forward link control channel from the first interlace to a second interlace so that a second packet will be delivered to the mobile unit in the second interlace that is different than the first interlace; and monitoring the first interlace and monitoring the second interlace to receive the second packet in response to receiving the first packet including information indicating that the second packet will be delivered to the mobile unit in the second interlace.

5. A method, as set forth in claim 4, wherein receiving the first packet over the forward link control channel comprises receiving the first packet that is multicast by the base station over a synchronous forward link control channel.

6. A method, as set forth in claim 4, wherein receiving the first packet over the forward link control channel comprises receiving the first packet over a synchronous forward link control channel in a system employing the High Rate Packet Data standard.

7. A method, as set forth in claim 1, wherein sending the second packet comprises sending the second packet including information indicating a change in the interlace used to carry packets over the forward link control channel from the second interlace to a third interlace so that a third packet will be delivered in the third interlace that is different than the second interlace.

8. A method, as set forth in claim 7, comprising sending the third packet over the forward link control channel in the third interlace.

9. A method, as set forth in claim 4, wherein receiving the second packet comprises receiving the second packet including information indicating that a third packet will be delivered in a third interlace of the forward link control channel, the third interlace being different than the second interlace.

10. A method, as set forth in claim 9, comprising monitoring said at least one third interlace of the forward link control channel to receive the third packet.

11. A method, comprising:

forming, at a base station, a first packet for transmission over a forward link control channel that uses a first interlace to carry control information for at least one mobile unit, wherein the forward link control channel is divided into a plurality of interlaces that comprise the first interlace, and wherein the interlaces comprise every N-th slot of the forward link control channel, and wherein N>1, the first packet including information indicating a change in the interlace allocated to carry packets over the forward link control channel from the first interlace to a second interlace of the forward link control channel for subsequent transmissions of control information for said at least one mobile unit;

transmitting, from the base station, the first packet over the forward link control channel in the first interlace; and transmitting, from the base station, a second packet over the forward link channel in the second interlace.

12. The method of claim 11, wherein forming the first packet comprises forming the first packet in response to the second interlace being allocated to increase the capacity of the forward link control channel for subsequent transmissions.

13. The method of claim 11, wherein forming the first packet comprises forming the first packet including a field indicating that the second interlace has been allocated to the forward link control channel for subsequent transmissions.

14. The method of claim 11, comprising forming the second packet including information indicating allocation of a third interlace in each interlace to the forward link control channel for subsequent transmissions.

15. The method of claim 14, comprising transmitting a third packet over the forward link channel using the third interlace.

16. The method of claim 11, comprising iteratively forming packets indicating that an additional interlace has been allocated to the forward link control channel and transmitting the packets over the forward link control channel until a capacity of the forward link control channel has been increased to a selected level.

17. The method of claim 16, wherein iteratively forming and transmitting the packets comprises iteratively forming and transmitting the packets until all of the interlaces have been allocated to the forward link control channel.

18. A method, comprising:
    monitoring, at a mobile unit, a forward link control channel that is divided into a plurality of interlaces, wherein each interlace comprises every N-th slot of the forward link control channel, and wherein N>1, and wherein the forward link control channel uses a first interlace to carry control information for the mobile unit;
    receiving, at the mobile unit, a first packet over the forward link control channel, the first packet including information indicating a change in the interlaces allocated to carry packets over the forward link control channel from the first interlace to a second interlace of the forward link control channel for subsequent transmissions;
    monitoring, at the mobile unit and in response to receiving the first packet, the first interlace and the second interlace for transmissions over the forward link control channel.

19. The method of claim 18, wherein receiving the first packet comprises receiving the first packet in response to the second interlace being allocated to increase the capacity of the forward link control channel for subsequent transmissions.

20. The method of claim 18, wherein receiving the first packet comprises receiving the first packet including a field indicating that the second interlace has been allocated to the forward link control channel for subsequent transmissions.

21. The method of claim 18, comprising receiving a second packet in the second interlace including information indicating allocation of a third interlace to the forward link control channel for subsequent transmissions.

22. The method of claim 18, comprising iteratively receiving packets indicating that an additional interlace has been allocated to the forward link control channel and monitoring additional interlaces allocated to the forward link control channel until a capacity of the forward link control channel has been increased to a selected level.

23. The method of claim 22, wherein iteratively receiving the packets and monitoring additional interlaces comprises iteratively receiving the packets and monitoring additional interlaces until all of the interlaces of each interlace have been allocated to the forward link control channel.

* * * * *